United States Patent [19]

Ryoke et al.

[11] Patent Number: 5,008,147

[45] Date of Patent: Apr. 16, 1991

[54] MAGNETIC RECORDING MEDIUM

[75] Inventors: Katsumi Ryoke; Masatoshi Takahashi; Akihiro Hashimoto; Kazuo Hasumi, all of Kanagawa, Japan

[73] Assignee: Fuji Photo Film Co., Ltd., Kanagawa, Japan

[21] Appl. No.: 216,566

[22] Filed: Jul. 8, 1988

[30] Foreign Application Priority Data

Jul. 8, 1987 [JP] Japan .................................. 62-170511

[51] Int. Cl.$^5$ .............................................. G11B 23/00
[52] U.S. Cl. .................................... 428/323; 428/336; 428/408; 428/425.9; 428/694; 428/900
[58] Field of Search ................ 428/323, 408, 425.9, 428/694, 900, 336; 427/131

[56] References Cited

U.S. PATENT DOCUMENTS

| | | | |
|---|---|---|---|
| 4,132,827 | 1/1979 | Mukaida et al. | 428/329 |
| 4,328,935 | 5/1982 | Steel | 428/900 |
| 4,562,117 | 12/1985 | Kikukawa et al. | 428/407 |
| 4,612,244 | 9/1986 | Kaneda et al. | 427/131 |
| 4,629,646 | 12/1986 | Ide et al. | 427/131 |
| 4,726,992 | 2/1988 | Asai et al. | 428/900 |
| 4,745,017 | 5/1988 | Miyoshi et al. | 428/408 |
| 4,761,338 | 8/1988 | Asano et al. | 428/425.9 |
| 4,786,557 | 11/1988 | Kakuishi et al. | 428/425.9 |
| 4,812,358 | 3/1989 | Miyake et al. | 428/900 |

*Primary Examiner*—Paul J. Thibodeau
*Attorney, Agent, or Firm*—Sughrue, Mion, Zinn, Macpeak & Seas

[57] ABSTRACT

A magnetic recording medium comprising a nonmagnetic support having on one surface thereof a magnetic layer and on the opposite surface thereof a backing layer comprising nonmagnetic particles dispersed in a binder, wherein said binder of said backing layer comprises from about 20 to 90 wt % of polycarbonate polyurethane, and said backing layer comprises from about 40 to 200 parts by weight of said binder per 100 parts by weight of said nonmagnetic particles.

10 Claims, No Drawings

MAGNETIC RECORDING MEDIUM

FIELD OF THE INVENTION

The present invention relates to a magnetic recording medium having an improved backing layer, and more particularly it relates to a magnetic recording medium having excellent electromagnetic characteristics and running durability at a high temperature and a high humidity.

BACKGROUND OF THE INVENTION

A magnetic recording medium is widely used for recording electromagnetic signals, and there are various shapes of a magnetic recording medium such as a tape, a disk or a card according to usage. A magnetic recording medium tape is used for audio recording, video recording and for computers. Hereinafter, a magnetic recording medium tape is referred to as a "magnetic tape".

A magnetic tape is basically composed of a nonmagnetic support and a magnetic layer containing ferromagnetic particles provided thereon. A magnetic tape further provided with a backing layer (back coat layer) on the opposite surface has been developed to improve running efficiency and is now used.

The backing layer using polyester polyurethane or polyether polyurethane as a binder and containing nonmagnetic particles dispersed in the binder has conventionally been known.

Polyester polyurethane has advantages such as a high tear strength, high solubility in a selected solvent, or the like, but has the disadvantage of extremely poor hydrolysis resistance. Although polyether polyurethane is excellent in hydrolysis resistance, it is much poorer than polyester polyurethane in mechanical strength and magnetic characteristics necessary for a magnetic tape when polyether polyurethane is used as a binder.

Accordingly, a magnetic recording medium using polyester polyurethane or polyether polyurethane as a binder for a backing layer has the defects that electromagnetic characteristics and running durability are greatly deteriorated at a high temperature and a high humidity.

One purpose of a backing layer is to improve running efficiency of a magnetic recording medium, and it is very important to develop a backing layer with good characteristics at a high temperature and a high humidity.

SUMMARY OF THE INVENTION

An object of the present invention is to provide a magnetic recording medium excellent in running efficiency and electromagnetic characteristics even at a high temperature and a high humidity.

Another object of the present invention is to provide a binder composition for use in a backing layer exhibiting stable and excellent characteristics even at a high temperature and a high humidity.

Other objects and effects of the present invention will be apparent from the following description.

It has now been found that the above objects of the present invention are attained by a magnetic recording medium comprising a nonmagnetic support having on one surface thereof a magnetic layer and on the opposite surface thereof a backing layer comprising nonmagnetic particles dispersed in a binder, wherein said binder of said backing layer comprises from about 20 to 90 wt % of polycarbonate polyurethane, and said backing layer comprises from about 40 to 200 parts by weight of said binder per 100 parts by weight of said nonmagnetic particles.

DETAILED DESCRIPTION OF THE INVENTION

A magnetic recording medium composed of a nonmagnetic support having provided on one surface a magnetic layer rand on the other surface a backing layer is already known. The magnetic recording medium of the present invention provides a backing layer having a novel and improved composition, and the magnetic recording medium apart from the backing layer can be prepared by a conventional method using conventional materials and any conventional shape (as described, e.g., in JP-B-56-26890 (the term "JP-B" used herein means an "examined Japanese patent publication"), West German Patent Application (OLS) 3,314,953, U.S. Pat. Nos. 4,411,953, 4,474,843, 4,592,952, 4,442,171, 4,414,270, 4,598,014, and British Patent 2,082,477B).

For example, nonmagnetic supports include plastics such as polyethylene terephthalate or the like, metals and ceramics in a form of a tape, a disk, a drum and the like, which may be pre-treated if necessary.

A magnetic layer is a layer containing ferromagnetic particles dispersed in a binder. Examples of the ferromagnetic particles include γ-iron oxide type ferromagnetic particles, cobalt-containing γ-iron oxide type ferromagnetic particles, ferromagnetic metal particles, barium ferrite and strontium ferrite. Various known additives can be optionally added into the magnetic layer.

The backing layer of the present invention and the composition of the backing layer are hereinafter explained in greater detail.

The backing layer of the present invention contains nonmagnetic particles dispersed in a binder containing from about 20 to 90 wt % of polycarbonate polyurethane.

The nonmagnetic particles can be those generally used as a granular filling material for use in a backing layer.

Example of the nonmagnetic particles include carbon black, graphite and inorganic filling materials, which can be used alone or in combination.

Specific examples of inorganic filling materials include those generally used as abrasive agents, such as $TiO_2$, $TiO$, $ZnO$, $CaO$, $SnO_2$, $SiO_2$, $\alpha$-$Fe_2O_3$, $Cr_2O_3$, $\alpha$-$Al_2O_3$, $ZnS$, $MoS_2$, $BaSO_4$, $CaSO_4$, $MgCO_3$, $BN$ and $SiC$. These may be used alone or in combination.

Of those, carbon black is preferably used. Examples of the carbon black includes furnace black, thermal black, black for coloring and acetylene black. It is preferred to use carbon black having an average particle size of from about 5 to 1,000 mμ, more preferably from about 10 to 300 mμ, (determined by an electron microscope), a specific surface area measured by a nitrogen absorption method of from about 1 to 800 $m^2$/g, more preferably from about 5 to 500 $m^2$/g, a pH of from about 4 to 11, more preferably from about 7 to 10 (JIS K6221), and a dibutylphthalate oil absorption amount of from about 10 to 800 ml/100 g, more preferably from about 20 to 500 ml/100 g, (JIS K6221). (The term "JIS" as used herein refers to a published "Japanese Industrial Standard".) As to the carbon black size, carbon black having an average diameter of from about 5 to 100 mμ is preferred to decrease the surface electric resistance of a coated film; carbon black having an average diameter of about 50 to 1,000 mµ is preferred to adjust the strength of a coated film; carbon black having an average diameter of about 100 mµ or less is preferred to control surface roughness of a coated film and to smooth the surface for reduction of spacing loss; and carbon black having an average diameter of about 50 µm or more is preferred to decrease the friction coefficient as a result of roughing a surface. Fine particle and coarse particle of carbon black can be used in combination. Carbon black having a surface which is partially graphited or grafted can also be used.

Particle sizes of other nonmagnetic particles are not limited, and those having particle sizes conventionally used can be employed. For example, when inorganic filling materials are used, the average particle size is preferably in the range of from about 0.01 to 10 µm, more preferably from about 0.5 to 5 µm.

The shapes of the nonmagnetic particles can be spherical, acicular, tabular, cubic and the like.

The binder for use in the backing layer of this invention is a binder containing from about 20 to 90 wt % of polycarbonate polyurethane.

The polycarbonate polyurethane is a copolymer obtained by condensing (1) a polyol, (2) a polyisocyanate and optionally (3) a chain-extending agent.

The above-described (1) polyol is (A) a polycarbonate polyol having a molecular weight of from about 300 to 200,000 and a hydroxy value of from about 20 to 1,000 synthesized by condensing or ester-exchanging at least one polyhydric alcohol represented by formula (I):

HO—R—OH (I)

wherein R represents, for example, —(CH$_2$)$_n$—(- 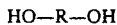 wherein n is an integer from 3 to 14),

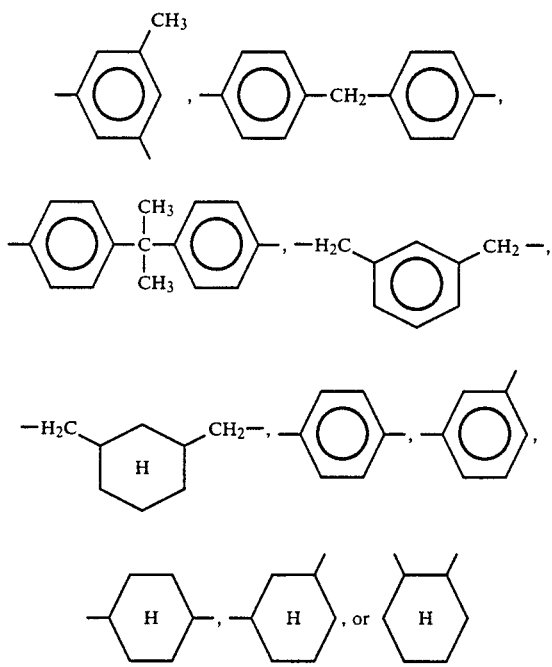

with at least one of phosgene, chloroformic ester, dialkylcarbonate or diallycarbonate; or (B) a polycarbonate polyester polyol having a molecular weight of from about 400 to 200,000 and a hydroxy value of from about 5 to 1,000 obtained by condensating the above polycarbonate polyol and a dihydric carboxylic acid represented by formula (II):

HOOC—R$^1$—COOH (II)

wherein R$^1$ represents an alkylene group having from 3 to 6 carbon atoms, a phenylene group or a cyclohexylene group.

Other polyols such as polyether polyol, polyester ether polyol or polyester may be used in combination with the above polyol in an amount of about 90 wt % or less based on the amount of the above-defined polyol.

The above (2) polyisocyanate is not particularly limited and those generally used can be used in the present invention. Examples of polyisocyanates include hexamethylene diisocyanate, tolydine diisocyanate, isophorone diisocyanate, xylylene diixocyanate, cyclohexane diisocyanate, toluidine diisocyanate, 2,4-tolylene diisocyanate, 2,6-tolylene diisocyante, 4,4'-diphenylmethane diisocyanate, p-phenylene diisocyanate, m-phenylene diisocyanate, and 1,5-naphthylene diisocyanate. Among these, hexamethylene diisocyanate, xylylene diixocyanate, 2,4-tolylene diisocyanate and 2,6-tolylene diisocyanate are preferably used.

The above (3) chain-extending agent as a comonomer may be any commonly used conventional substance such as the above described polyhydric alcohols, aliphatic polyamines, acyclic polyamines or aromatic polyamines. Among these, 1,4-butanediol and Bisphenol A are preferably used.

The molar ratio of the components (1), (2) and (3) is preferably (0.1 to 5)/(0.1 to 5)/(0.1 to 5), and more preferably (0.5 to 2)/(0.5 to 2)/(0.5 to 2).

The polycarbonate polyurethane obtained from the above described (1) and (2) and, if desired (3) preferably has a number average molecular weight of from about 10,000 to 250,000. When a polycarbonate polyurethane having a lower molecular weight than the above range is used, running durability becomes poor. When a polycarbonate polyurethane having a higher molecular weight than the above range is used, solubility in a solvent is decreased or dispersibility becomes poor, which is undesirable from the industrial point of view.

The polycarbonate polyurethane may contain at least one functional group selected from the group consisting of —SO$_3$M, —COOM, —NH$_2$, —SH, —OH, a phosphoric acid group and a phosphoric acid ester group, wherein M represents a hydrogen atom or an alkali metal atom. Among these, —SO$_3$M, —COOM, —OH, a phosphoric acid group and a phosphoric acid ester group are preferably used. The polycarbonate polyurethane having such a functional group can be prepared by a known conventional method.

The above described polycarbonate polyurethane is commercially available under the trade names of, for example, "Polycarbonate polyurethane 9000 Series, 7000 Series and 5000 Series" manufactured by Dainichiseika Colour & Chemicals Mfg. Co., Ltd. and "5740X Series" manufactured by Goodrich Co., Ltd, and is described, e.g., in JP-A-62-114120, 61-264509, 61-120338, 61-289522, 61-222027 (the term "JP-A" used herein means a "published unexamined Japanese patent application"), and U.S. Pat. No. 4,643,946.

The binder for use in the backing layer in this invention is a mixture of the above polycarbonate polyurethane in an amount of from about 20 to 90 wt %, preferably from about 25 to 60 wt % and other binders. When the content of the above polycarbonate polyurethane in the backing layer is higher than the above ranges, the reproduced output of the recording medium decreases, the still reproduction becomes poor and the head clogging takes place. When the content is lower than the above ranges, the still life and the head clogging are deteriorated.

Examples of the binders to be used in combination with the above polycarbonate polyurethane are not particularly limited, and conventional binders for a magnetic recording medium can be used, such as thermoplastic resins, thermosetting resins, reactive type resins or a mixture thereof.

Examples of the above described thermoplastic resins include those having a softening point of about 150° C. or lower and an average molecular weight of from about 10,000 to 300,000, such as a copolymer of vinyl chloride and vinyl acetate, a copolymer of vinyl chloride and vinylidene chloride, a copolymer of vinyl chloride and acrylonitrile, a copolymer of acrylate and acrylonitrile, a copolymer of acrylate and vinylidene chloride, a copolymer of acrylate and styrene, a copolymer of methacrylate and acrylonitrile, a copolymer of methacrylate and vinylidene chloride, a copolymer of methacrylate and styrene, a urethane elastomer, a nylon-silicon type resin, a nitrocellulose-polyamide resin, a polyvinyl fluoride, a copolymer of vinylidene chloride and acrylonitrile, a copolymer of butadiene and acrylonitrile, a polyamide resin, a polyvinyl butyral, cellulose derivatives (e.g, cellulose acetate butyrate, cellulose diacetate, cellulose triacetate and cellulose propionate, nitrocellulose), copolymer of styrene and butadiene, a polyester resin, a copolymer of chlorovinyl ether and acrylate, an amino resin and various synthetic rubber type thermoplastic resins. Of those, vinyl chloride polymers and copolymers, vinylidene chloride polymers and copolymers and nitrocellulose are particularly preferred.

The above described thermosetting resins or reactive type resins are those having a molecular weight of about 200,000 or lower when they are in a coating composition and the molecular weight becomes extremely high when they are coated, dried and heated. Specific examples thereof include phenol resins, phenoxy resins, epoxy resins, polyurethane hardenable resins, urea resins, melamine resins, alkyd resins, silicone resins, acryl type reactive resins, epoxy-polyamide resins, nitrocellulose melamine resins, a mixture of a high molecular weight polyester resin and an isocyanate prepolymer, a mixture of a methacrylate copolymer and a diisocyanate prepolymer, a mixture of a polyester polyol and a polyisocyanate, urea formaldehyde resins, a mixture of a low molecular weight glycol, a high molecular weight diol and triphenylmethane triisocyanate, polyamine resins and the mixture thereof. Of these, phenoxy resins and epoxy resins are particularly preferred.

Furthermore, these binders may contain conventional functional groups. Binders containing —SO$_3$M, —SO$_2$M, —COOM, —NH$_2$, —N$^+$R$_4$, —OH, a phosphoric acid group or a phosphoric acid ester group (wherein M represents a hydrogen atom or an alkali metal atom, and R represents a lower alkyl group having 10 or less of carbon atoms) are particularly preferred. The content of these functional groups is preferably from about $1\times10^{-6}$ to $1\times10^{-2}$ equivalent per 1 g of the binder.

The above described phenoxy resins are linear polymers obtained from the condensation reaction of bisphenol A and epichlorohydrin and having the same structure unit as that of widely used epoxy resins. However, the widely used epoxy resins have a degree of polymerization of at most 20 but the phenoxy resin has a degree of polymerization of from about 50 to 700 and is thermoplastic when used alone and can become thermosetting when cross-linked with amino resins and the like.

A compound having at least two isocyanate groups (polyisocyanate) may further be incorporated in the above described binder. Examples of such a compound includes isocyanates such as tolylene diidocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate or the like, reaction products of these isocyanates and polyalchols, and polyisocyanates produced by condensing those isocyanates. The above polyisocyanates are commercially available under the trade names of "Collonate L", "Collonate HL", "Collonate 2030", "Collonate 2031", "Millionate MR" and "Millionate MLT" manufactured by Nippon Polyurethane Co., Ltd.; "Takenate D-102", "Takenate D-110N", "Takenate D-200", and "Takenate D-202" manufactured by Takeda Chemical Industries, Ltd,; and "Desmodule L", "Desmodule IL", "Desmodule N" and "Desmodule HL" manufactured by Sumitomo Bayer Co., Ltd.

The preferred amount ratio of the binder and the nonmagnetic particles in the backing layer of the present invention is from about 40 to 200 parts by weight, more preferably from about 50 to 130 parts by weight, of the binder per 100 parts by weight of nonmagnetic particles. When the amount of the binder is less than the above range, running durability of the magnetic recording medium deteriorates. When it is more than the above range, a desired surface electric resistance cannot be obtained or the friction coefficient tends to increase due to a low packing density of the nonmagnetic particles.

The backing layer of the present invention can be provided on the surface of the nonmagnetic support opposite surface to the magnetic layer by any conventional method (as described, e.g., in West German Patent Application (OLS) 3,314,953, U.S. Pat. Nos. 4,411,953, 4,474,843, 4,592,952, 4,442,171, 4,414,270, 4,598,014, and British Patent 2,082,477B). A suitable method of providing a backing layer includes, for example: dispersing or dissolving the above described nonmagnetic particles and the above described binder components and, if necessary, additives in an organic solvent to prepare a coating composition, coating the resulting coating composition on a surface of a support, drying the thus formed layer to evaporate the solvent and hardening the binder components.

The backing layer is provided so that the thickness of the backing layer of the thus obtained magnetic tape is generally from about 0.8 to 3.0 μm, preferably from about 1.5 to 2.5 μm.

As the organic solvents, the dispersing and mixing methods and the apparatus therefor, the methods of coating a coating composition on a support and the apparatuses therefor, those conventional in the art may be used.

Provision of a the backing layer and the magnetic layer on the support may be carried out in an optional order, and both layers may be provided simultaneously. Further, any of the magnetic layer or the backing layer (preferably the magnetic layer) may be coated, dried, and if necessary hardened by heating to harden the coated layer; and then the other layer (preferably the backing layer) may be provided, dried and hardened by heating to prepare a magnetic tape.

As the method for producing the magnetic recording medium of the present invention and additives and additional layers which can be used in the present invention, those described, e.g., in JP-A-59-19230, 59-142741, 59-165239, West German Patent 3,403,822A, U.S. Pat. Nos. 4,442,159, 4,450,199, Dutch Patent Application Nos. 8105575, 8105576, JP-B-58-43816 and 59-46051 may be used.

Lubricating agents may be provided on the surface of the backing layer of the present invention. The lubricating agents can be present on the surface of the backing layer by dissolving or dispersing lubricating agents in a coating composition for the backing layer, by coating the solution of lubricating agents in an organic solvent on the backing layer and drying, or by coating the solution of lubrication agents in an organic solvent on a surface of the magnetic layer and contacting the backing layer with the magnetic layer under a winding tension of preferably about 200 g/inch width so as to transfer the lubricating agent to the surface of the backing layer.

Examples of the lubricating agents include organic compounds such as higher fatty acids, metal soaps, higher fatty acid amides, higher fatty acid esters, mineral oils or fatty oils, silicone oils, inorganic fine particles, plastic fine particles, α-olefin polymers, unsaturated aliphatic hydrocarbons which are liquid at a normal temperature, fluorocarbons and mixtures thereof. The amount of the lubricating agent is preferably from about 0.01 to 2.0 parts by weight per 100 parts by weight of the nonmagnetic particles.

The present invention will be explained in more detail by the following Examples and Comparative Examples but the present invention is not to be construed as being limited thereto. In each Example and Comparative Example, all parts, percents and ratios are by weight.

SYNTHESIS EXAMPLE

A mixture of 1 mol of poly(hexamethylene carbonate)glycol (molecular weight: 1,500) prepared in accordance with the disclosure of Example 1 of U.S. Pat. No. 4,131,731 and 1 mol of 1,4-butandiol (chain-extending agent) was heated at about 100° C. 1 mole of methylene bisdiphenyl diisocyanate heated at about 100° C. was added into the mixture and reacted by a high temperature random fusion polymerization method. The reaction was an exothermic reaction, and within from about 1 to 5 minutes after mixing those substances, the temperature increased to about 200° to 250° C. It was confirmed by the increase of viscosity that polymerization proceeded. A polycarbonate polyurethane having a weight average molecular weight of $10 \times 10^4$, a number average molecular weight of $5.5 \times 10^4$, a viscosity (18%NV) of 9 poise and an elongation of 1,200% or less was prepared.

EXAMPLE 1

The magnetic coating composition prepared by the following method and having the following composition was coated on a polyethylene terephthalate support (nonmagnetic support) having a thickness of 20 μm so that the dry thickness of the coated layer was 6.0 μm, subjected to orientation, dried and calendered.

Then, the coating composition for a backing layer having the following composition prepared by the following method was coated on the opposite surface of the polyethylene terephthalate support to the magnetic layer so that the dry thickness of the backing layer was 2.0 μm. After the coating composition was coated, it was dried and subjected to surface smoothing treatment and the magnetic recording medium obtained was wound up.

The wound-up medium was heated at 40° C. for 48 hours for hardening and the medium was slit to a 1 inch width to prepare a sample tape.

The thus obtained sample tape was evaluated in the following manner and the results are shown in Table 1.

Magnetic coating composition:

| | |
|---|---|
| Co containing γ-Fe$_2$O$_3$ particle (Nitrogen absorption method: specific surface area: 40 m$^2$/g, Hc: 850 Oe) | 300 parts |
| Copolymer of vinyl chloride and vinyl acetate ("VMCH", manufactured by Union Carbide Co., Ltd., Mw: 60,000) | 40 parts |
| Polyurethane resin ("UR 8300", manufactured by TOYOBO CO., LTD., Mw: 30,000) | 17 parts |
| Carbon black (average particle size: 20 mμ) | 15 parts |
| Lecithin | 1.5 parts |
| Oleic acid | 3 parts |
| Octyl laurate | 4 parts |
| Lauric acid | 3 parts |
| Butyl acetate | 700 parts |
| Methyl ethyl ketone | 300 parts |

A part of the above composition was put in a ball mill, mixed and kneaded and then the rest thereof was added into the ball mill and mixed and kneaded, and 24 parts of polyisocyanate compound ("Collonate 3040", manufactured by Nippon Polyurethane Co., Ltd.) was added and mixed and dispersed to prepare a magnetic coating composition.

Coating composition of backing layer:

| | |
|---|---|
| Carbon black ("CONDUCTEX SC", average particle size: 20 mμ) | 100 parts |
| Polycarbonate polyurethane (manufactured in Synthesis Example) | 75 parts |
| Fhenoxy resin ("PKHH"manufactured by Union Carbide Co., Ltd., Mw: 40,000) | 20 parts |
| Copper oleate | 1 part |
| Stearic acid | 1 part |
| Silicone oil "KF 69"manufactured by Shin-Etsu Chemical Co., Ltd.) | 0.1 part |
| Methyl ethyl ketone | 700 parts |
| Cyclohexanone | 300 parts |

The above composition was put in a ball mill, mixed and kneaded, and 25 parts of polyisocyanate compound ("Collonate 2030" manufactured by Nippon Polyurethane Co., Ltd.) was added thereto, uniformly mixed, kneaded and dispersed, and the viscosity of the composition was adjusted so that the coating composition for the backing layer was prepared.

Evaluation of the sample tapes were carried out by the following manner.

Decrease of reproduced output:

Using a video tape recorder "BVH-500" manufactured by Sony Corporation with a ferrite head, a tape was made running at a normal running speed and the reproduced output of RF was measured. The reproduced output is shown as a relative value when the reproduced output of the sample tape of Example 1 was assumed to be 0 dB.

Friction coefficient:

A tape which had made 10 passes on the VTR was passed around a SUS pole with a 180° contact at the surface of the magnetic layer at a tape tension $T_1$ of 200 g and a speed of 1.5 cm/sec., and then the tape tension $T_2$ was read.

The friction coefficient $\mu$ was calculated by the following equation.

$$\mu = (1/\pi)\ln(T_2/T_1)$$

Still life:

The recorded signals were reproduced in a still mode and the reproduced RF output level was recorded by a recorder and the period of time for signal level to decrease to ½ the original level was measured. A still life of 300 minutes or higher was acceptable.

Head clogging at full length running:

Repeated running tests of a full length (30 minutes) tape were conducted, and whether recorded signals were not faithfully reproduced on a monitor due to head clogging was checked. Rank A means that head clogging did not take place even after 10 passes, and rank B means that head clogging took place in the first pass.

EXAMPLE 2

The same procedure as in Example 1 was repeated except that the composition of the backing layer was changed so that the amount of polycarbonate polyurethane was changed to 50 parts, the amount of the phenoxy resin was changed to 20 parts, the amount of the polyisocyanate compound was changed to 15 parts, and further 35 parts of polyester polyurethane ("C7209", manufactured by DAINIPPON INK AND CHEMICALS, INC., Mw: 100,00) to prepare a sample tape.

The evaluation result of the sample tape is shown in Table 1.

EXAMPLE 3

The same procedure as in Example 1 was repeated except that the composition of the backing layer was changed so that the amount of the polycarbonate polyurethane was changed to 63 parts, the amount of the phenoxy resin was changed to 17 parts, and the amount of the polyisocyanate compound was changed to 21 parts to prepare a sample tape.

The evaluation result of the sample tape is shown in Table 1.

EXAMPLE 4

The same procedure as in Example 1 was repeated except that the composition of the backing layer was changed s that the amount of the polycarbonate polyurethane was changed to 38 parts, the amount of the phenoxy resin was changed to 10 parts, and the amount of the polyisocyanate compound was changed to 13 parts to prepare a sample tape.

The evaluation result of the sample tape is shown in Table 1.

EXAMPLE 5

The same procedure as in Example 1 was repeated except that the amount of the polycarbonate polyurethane was changed to 75 parts, the amount of the polyisocyanate compound was changed to 25 parts, and the phenoxy resin was replaced by 20 parts of vinyl chloride resin ("MR-110", manufactured by Nippon Zeon Co., Ltd., Mw: 40,000) to prepare a sample tape.

The evaluation result of the sample tape is shown in Table 1.

EXAMPLE 6

The same procedure as in Example 1 was repeated except that the composition of the backing layer was changed so that the amount of the polycarbonate polyurethane was changed to 80 parts, the amount of the polyisocyanate compound was changed to 20 parts, and the phenoxy resin was replaced by 20 parts of nitrocellulose (manufactured by DAICEL CHEMICAL INDUSTRIES, LTD., Mw: 20,000) to prepare a sample tape.

The evaluation result of the sample tape is shown in Table 1.

EXAMPLE 7

The same procedure as in Example 5 was repeated except that the polycarbonate polyurethane in the coating composition for the backing layer was replaced by 45 parts of polycarbonate polyurethane having a $-SO_3Na$ group at a concentration of $2.0 \times 10^{-5}$ eq/g (which was synthesized in the same manner as in the Synthesis Example) to prepare a sample tape.

The evaluation result of the sample tape is shown in Table 1.

EXAMPLE 8

The same procedure as in Example 5 was repeated except that the polycarbonate polyurethane in the coating composition for the backing layer was replaced by 30 parts of polycarbonate polyurethane having a $-COOH$ group at a concentration of $5.4 \times 10^{-4}$ eq/g (synthesized in the same manner as in Synthesis Example) to prepare a sample tape.

The evaluation result of the sample tape is shown in Table 1.

EXAMPLE 9

The same procedure as in Example 5 was repeated except that the polycarbonate polyurethane in the coating composition for the backing layer was replaced by 50 parts of polycarbonate polyurethane having a $-OPO(OH)_2$ group at a concentration of $1.3 \times 10^{-5}$ eq/g and 50 parts of polycarbonate polyurethane having an $N-CH_3$ group at a concentration of $8.0 \times 10^{-5}$ eq/g (synthesized in the same manner as in Synthesis Example) to prepare a sample tape.

The evaluation result of the sample tape is shown in Table 1.

EXAMPLE 10

The same procedure as in Example 5 was repeated except that the polycarbonate polyurethane in the coating composition for the backing layer was replaced by 75 parts of polycarbonate polyurethane having $-COOH$ group at a concentration of $4.0 \times 10^{-5}$ eq/g and having an ester bond at a concentration of $2 \times 10^{-3}$ eq/g to prepare a sample tape.

The evaluation result of the sample tape is shown in Table 1.

COMPARATIVE EXAMPLE 1

The same procedure as in Example 1 was repeated except that the composition of the backing layer was changed so that the amount of the polycarbonate polyurethane was changed to 110 parts, the amount of the polyisocyanate compound was changed to 10 parts, and the phenoxy resin was not used to prepare a sample tape.

The evaluation result of the sample tape is shown in Table 1.

COMPARATIVE EXAMPLE 2

The same procedure as in Example 1 was repeated except that the composition of the backing layer was changed so that the amount of the polycarbonate polyurethane was changed to 30 parts, the amount of the phenoxy resin was changed 80 parts, and the amount of the polyisocyanate compound was changed to 10 parts to prepare a sample tape.

The evaluation result of the sample tape is shown in Table 1.

COMPARATIVE EXAMPLE 3

The same procedure as in Example 1 was repeated except that the polycarbonate polyurethane in the coating composition for a backing layer was replaced by 75 parts of polyester polyurethane ("C7209" manufactured by DAINIPPON INK AND CHEMICALS INC., Mw: 100,00) to prepare a sample tape.

The evaluation result of the sample tape is shown in Table 1.

COMPARATIVE EXAMPLE 4

The same procedure as in Example 1 was repeated except that the polycarbonate polyurethane in the coating composition for a backing layer was replaced by 75 parts of polyester polyurethane ("Pandex 5102A", manufactured by DAINIPPON INK AND CHEMICALS INC., Mw: 50,000) to prepare a sample tape.

The evaluation results of the sample tape are shown in Table 1.

COMPARATIVE EXAMPLE 5

The same procedure as in Example 1 was repeated except that the composition of the backing layer was changed so that the amount of the polycarbonate polyurethane was changed to 19 parts, the amount of the phenoxy resin was changed to 5 parts, and the amount of the polyisocyanate compound was changed to 6 parts to prepare a sample tape.

The evaluation result of the sample tape is shown in Table 1.

COMPARATIVE EXAMPLE 6

The same procedure as in Example 1 was repeated except that the composition of the backing layer was changed so that the amount of the polycarbonate polyurethane was changed to 150 parts, the amount of the phenoxy resin was changed to 40 parts, and the amount of the polyisocyanate compound was changed to 50 parts to prepare a sample tape.

The evaluation result of the sample tape is shown in Table 1.

TABLE 1

| Example | Decrease of reproduced output (dB) Condition A | Friction coefficient Condition A | Friction coefficient Condition B | Still life Condition B | Head clogging at full length running Condition A |
| --- | --- | --- | --- | --- | --- |
| Example 1 | 0 | 0.20 | 0.20 | 300 min. or higher | A |
| Example 2 | 0 | 0.20 | 0.21 | 300 min. or higher | A |
| Example 3 | 0 | 0.20 | 0.20 | 300 min. or higher | A |
| Example 4 | 0 | 0.22 | 0.22 | 300 min. or higher | A |
| Example 5 | 0 | 0.20 | 0.20 | 300 min. or higher | A |
| Example 6 | 0 | 0.20 | 0.20 | 300 min. or higher | A |
| Example 7 | 0 | 0.20 | 0.21 | 300 min. or higher | A |
| Example 8 | 0 | 0.20 | 0.21 | 300 min. or higher | A |
| Example 9 | 0 | 0.20 | 0.20 | 300 min. or higher | A |
| Example 10 | 0 | 0.20 | 0.19 | 300 min. or higher | A |
| Comparative Example 1 | −2 | 0.24 | 0.21 | 100 min. | B |
| Comparative Example 2 | 0 | 0.20 | 0.20 | 60 min. | B |
| Comparative Example 3 | −10 | 0.5 or higher | 0.35 | 120 min. | B |
| Comparative Example 4 | −5 | 0.5 or higher | 0.30 | 140 min. | B |
| Comparative Example 5 | 0 | 0.34 | 0.31 | 180 min. | A |
| Comparative Example 6 | −2 | 0.31 | 0.28 | 180 min. | B |

Condition A: 70° C., 80 % RH
Condition B: 40° C., 80 % RH

It is clear from the results of each Example and Comparative Examples 3 and 4 shown in Table 1 that tapes using the polycarbonate polyurethane as a binder in the backing layer were excellent in the decrease of reproduced output, the friction coefficient, the still life and the head clogging at a full length, at a high temperature and a high humidity, when compared with tapes using a conventionally known polyester polyurethane.

It is also clear from the results of the Examples and Comparative Examples 1 and 2 that both the still life and the head clogging at full length running were greatly deteriorated when the content of the polycarbonate polyurethane in the binder of the backing layer was outside the ranges of from about 20 to 90 wt %.

It is clear from the comparison between each Example and Comparative Examples 5 and 6 that when the amount ratio of the binder to the nonmagnetic particles in the baking layer was too high, the friction coefficient was high and when it was too low, the still life was deteriorated.

Even when the magnetic recording medium of the present invention is used at a high temperature and a high humidity for a long period of term, decrease of the reproduced output does not take place, the still durability is excellent, the head clogging hardly occurs and the blocking caused by the backing layer hardly occurs. Therefore, the magnetic recording medium of the present invention is extremely excellent in electromagnetic properties and provides extremely good running durability.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a nonmagnetic support having on one surface thereof a magnetic layer and on the opposite surface thereof a backing layer comprising nonmagnetic particles dispersed in a binder, wherein said binder of said backing layer comprises from about 20 to 90 wt % of polycarbonate polyurethane, and said backing layer comprises from about 40 to 200 parts by weight of said binder per 100 parts by weight of said nonmagnetic particles.

2. A magnetic recording medium as claimed in claim 1, wherein said nonmagnetic particles comprise carbon black.

3. A magnetic recording medium as claimed in claim 2, wherein said carbon black has an average particle size of from about 5 to 1,000 m$\mu$, a nitrogen absorption specific surface area of from about 1 to 800 m$^2$/g, a pH of from about 4 to 11, and a dibutylphthalate oil adsorption amount of from about 10 to 800 ml/100 g.

4. A magnetic recording medium as claimed in claim 1, wherein said polycarbonate polyurethane is a copolymer comprising (a) a polycarbonate polyol having a molecular weight of from about 300 to 200,000 and a hydroxyl value of from about 20 to 1,000, or a polycarbonate polyester polyol having a molecular weight of from about 400 to 200,000 and a hydroxyl value of from about 500 to 1,000; and (b) a polyisocyanate selected from the group consisting of hexamethylene diisocyanate, tolydine diisocyanate, isophorone diisocyanate, xylylene diisocyanate, cyclohexane diisocyanate, toluidine diisocyanate, 2,4 tolylene diisocyanate, 2,6-tolylene diisocyanate, 4,4'-diphenylmethane diisocyanate, p-phenylene diisocyanate, m-phenylene diisocyanate and 1,5-naphthylene diisocyanate.

5. A magnetic recording medium as claimed in claim 1, wherein said polycarbonate polyurethane is substituted with at least one substituent selected from the group consisting of —SO$_3$M, —COOM, —NH$_2$, —SH, —OH, a phosphoric acid group and a phosphoric acid ester group, wherein M represents a hydrogen atom or an alkali metal atom.

6. A magnetic recording medium as claimed in claim 1, wherein said binder further comprises at least one resin selected from the group consisting of a phenoxy resin, an epoxy resin, a nitrocellulose, a vinyl chloride polymer, a vinyl chloride copolymer, a vinylidene chloride polymer, and a vinylidene chloride copolymer.

7. A magnetic recording medium as claimed in claim 1, wherein said backing layer has a thickness of from about 0.8 to 3.0 $\mu$m.

8. A magnetic recording medium as claimed in claim 1, wherein said binder of said backing layer comprises (1) said polycarbonate polyurethane, (2) at least one of a phenoxy resin, a polyvinyl chloride and a copolymer of vinyl chloride and vinyl acetate, and (3) a polyisocyanate.

9. A magnetic recording medium as claimed in claim 1, wherein said binder of said backing layer comprises (1) said polycarbonate polyurethane, (2) at least one phenoxy resin, and (3) a polyisocyanate.

10. A magnetic recording medium as claimed in claim 1, wherein the binder of the magnetic layer further comprises a polyurethane other than polycarbonate polyurethane.

* * * * *